(12) United States Patent
Luetzenkirchen et al.

(10) Patent No.: US 12,425,267 B2
(45) Date of Patent: Sep. 23, 2025

(54) 5G TIME SENSITIVE NETWORKING BRIDGE CONFIGURATION

(71) Applicant: Intel Corporation, Santa Clara, CA (US)

(72) Inventors: Thomas Luetzenkirchen, Taufkirchen (DE); Alexandre Saso Stojanovski, Paris (FR)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 17/922,205

(22) PCT Filed: Jun. 8, 2021

(86) PCT No.: PCT/US2021/036422
§ 371 (c)(1),
(2) Date: Oct. 28, 2022

(87) PCT Pub. No.: WO2022/020020
PCT Pub. Date: Jan. 27, 2022

(65) Prior Publication Data
US 2023/0188381 A1    Jun. 15, 2023

Related U.S. Application Data

(60) Provisional application No. 63/055,711, filed on Jul. 23, 2020, provisional application No. 63/055,714, filed on Jul. 23, 2020.

(51) Int. Cl.
*H04L 12/46* (2006.01)
*H04W 76/11* (2018.01)
(Continued)

(52) U.S. Cl.
CPC ......... *H04L 12/4625* (2013.01); *H04W 76/11* (2018.02); *H04W 88/14* (2013.01); *H04W 92/02* (2013.01)

(58) Field of Classification Search
CPC .............. H04L 12/4625; H04W 76/11; H04W 88/14; H04W 92/02
See application file for complete search history.

(56) References Cited

U.S. PATENT DOCUMENTS

2022/0030641 A1* 1/2022 Wang .................... H04W 40/02

FOREIGN PATENT DOCUMENTS

| EP | 3996349 A1 * | 5/2022 | .............. H04J 3/025 |
| WO | WO-2018117280 A1 * | 6/2018 | .............. H04L 47/24 |

(Continued)

OTHER PUBLICATIONS

3GPP TS 23.501 version 16.5.0 Release 16 (Jul. 2020), System architecture for the 5G System. (Year: 2020).*

(Continued)

*Primary Examiner* — Kevin C. Harper
(74) *Attorney, Agent, or Firm* — Schwegman Lundberg & Woessner, P.A.

(57) ABSTRACT

A system to support time sensitive networking (TSN) in a 5G system is described. The TSN application function (AF) sends to a device-side translator a Port Management Information Container (PMIC) and port number that has a Stream Identification type value and Stream Identification controlling parameters that depend on the Stream Identification type value for per-stream policing and filtering in a distributed bridge. During establishment of the bridge, the network-side translator port numbers are provided to the TSN AF in a Bridge Management Information Container (BMIC). Any PDU session of the bridge is able to be selected for Ethernet port and Bridge management procedures between the network-side translator and the TSN AF.

8 Claims, 16 Drawing Sheets

(51) Int. Cl.
*H04W 88/14* (2009.01)
*H04W 92/02* (2009.01)

(56) References Cited

FOREIGN PATENT DOCUMENTS

| WO | WO-2018174516 A1 | 9/2018 |
|---|---|---|
| WO | WO-2022020020 A1 | 1/2022 |
| WO | WO-2022020020 A9 | 1/2022 |

OTHER PUBLICATIONS

IEEE P802.1, Bridges and Bridged Networks, Apr. 26, 2018 (Year: 2018).*
3GPP TR 23.700-20 vo.4.0 (Jun. 2020), Technical Specification Group Services and System Aspects, (Year: 2020).*
"3rd Generation Partnership Project; Technical Specification Group Services and System Aspects; Study on enhanced support of Industrial Internet of Things (IIoT) in the 5G System (5GS) (Release 17)", 3GPP Draft; 23700-20-040, 3rd Generation Partnership Project (3GPP), Mobile Competence Centre; 650, Route Des Lucioles; F-06921 Sophia-Antipolis Cedex; France, [Online]. Retrieved from the Internet: <https://ftp.3gpp.org/tsg_sa/WG2_Arch/Latest_SA2_Specs/Latest_draft_S2_Specs/23700-20-040.zip 23700-20-v040-rm.docx>, (Jun. 29, 2020).
"Bridges and Bridged Networks—Amendment: Asynchronous Traffic Shaping", LAN/MAN Standards Committee of the IEEE Computer Society: IEEE Draft; 802-1QCR-D0-4, IEEE-SA, Piscataway, NJ USA, vol. 802.1 cr drafts; 802.1 qor drafts, No. D0.4, [Online]. Retrieved from the Internet: <http://ieee802.org/1/files/private/cr-drafts/d0/802-1 Qcr-D0-4.pdf>, (Apr. 26, 2018), 1-110.
"European Application Serial No. 21845990.7, Extended European Search Report mailed Jun. 14, 2024", 17 pgs.
"International Application Serial No. PCT/US2021/036422, International Preliminary Report on Patentability mailed Feb. 2, 2023", 7 pgs.
Intel, et al., "Spliting port management information into port- and bridgespecific information", 3GPP Draft; SP-200515, 3rd Generation Partnership Project (3GPP), Mobile Competence Centre ; 650, Route Des Lucioles ; F-06921 Sophia-Antipolis Cedex ; France,vol. TSG SA, No. Electronic Meeting, [Online]. Retrieved from the Internet: <https://ftp.3gpp.org/tsg_SA/TSGS_88E_Electronic/Docs/SP-200515.zipSP200515_wasS22003260_23501_CR2230_TSN_BridgeInfo_v2.docx>, (Jun. 24, 2020), 10 pages.
"European Application Serial No. 21845990.7, Response filed Dec. 20, 2024 to Extended European Search Report mailed Jun. 14, 2024", 73 pgs.
"3GPP TS 23.501 V 16.5.0", 3GPP; TSG SA; System architecture for the 5G System (5GS), Stage 2 (Release 16), (Jul. 9, 2020).
"International Application Serial No. PCT/US2021/036422, International Search Report mailed Oct. 1, 2021", 4 pgs.
"International Application Serial No. PCT/US2021/036422, Written Opinion mailed Oct. 1, 2021", 5 pgs.
Ericsson, "5G bridge port allocation and mapping tables", S2-1907475, 3GPP TSG-SA WG2 Meeting #134, (Jun. 18, 2019).
Huawei, "Updates for Bridge Delay information reporting", S2-1911172, 3GPP TSG-WG SA2 Meeting #136, Reno, NV, USA, (Nov. 8, 2019).
ZTE, "Discussion on time conversion between TSN clock and 5GS clock", S2-1911909, SA WG2 Meeting #S2-136, Reno, Nevada, USA, (Nov. 8, 2019).

* cited by examiner

5G TIME SENSITIVE NETWORKING BRIDGE CONFIGURATION

PRIORITY CLAIM

This application is a U.S. National Stage Filing under 35 U.S.C. 371 from International Application No. PCT/US2021/036422, filed Jun. 8, 2021 and published in English as WO 2022/020020 on Jan. 27, 2022, 2022, which claims the benefit of priority to U.S. Provisional Patent Application Ser. No. 63/055,711, filed Jul. 23, 2020 and U.S. Provisional Patent Application Ser. No. 63/055,714, filed Jul. 23, 2020, each of which is incorporated herein by reference in its entirety.

Embodiments pertain to wireless communications in 5G, or new radio (NR), systems. Some embodiments related to a bridge configuration in 5G systems.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)/$5^{th}$ generation (5G)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
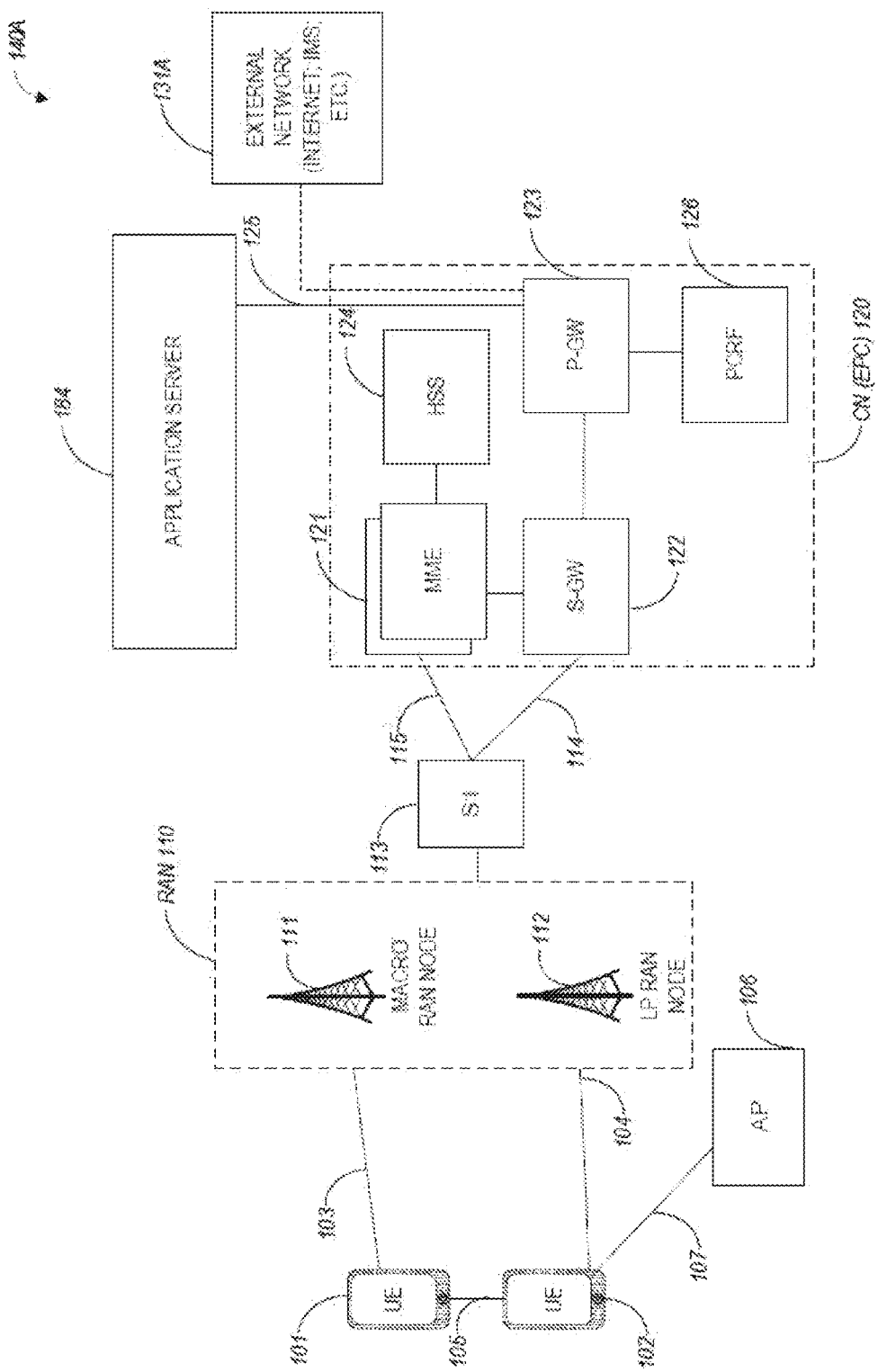
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS)

domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
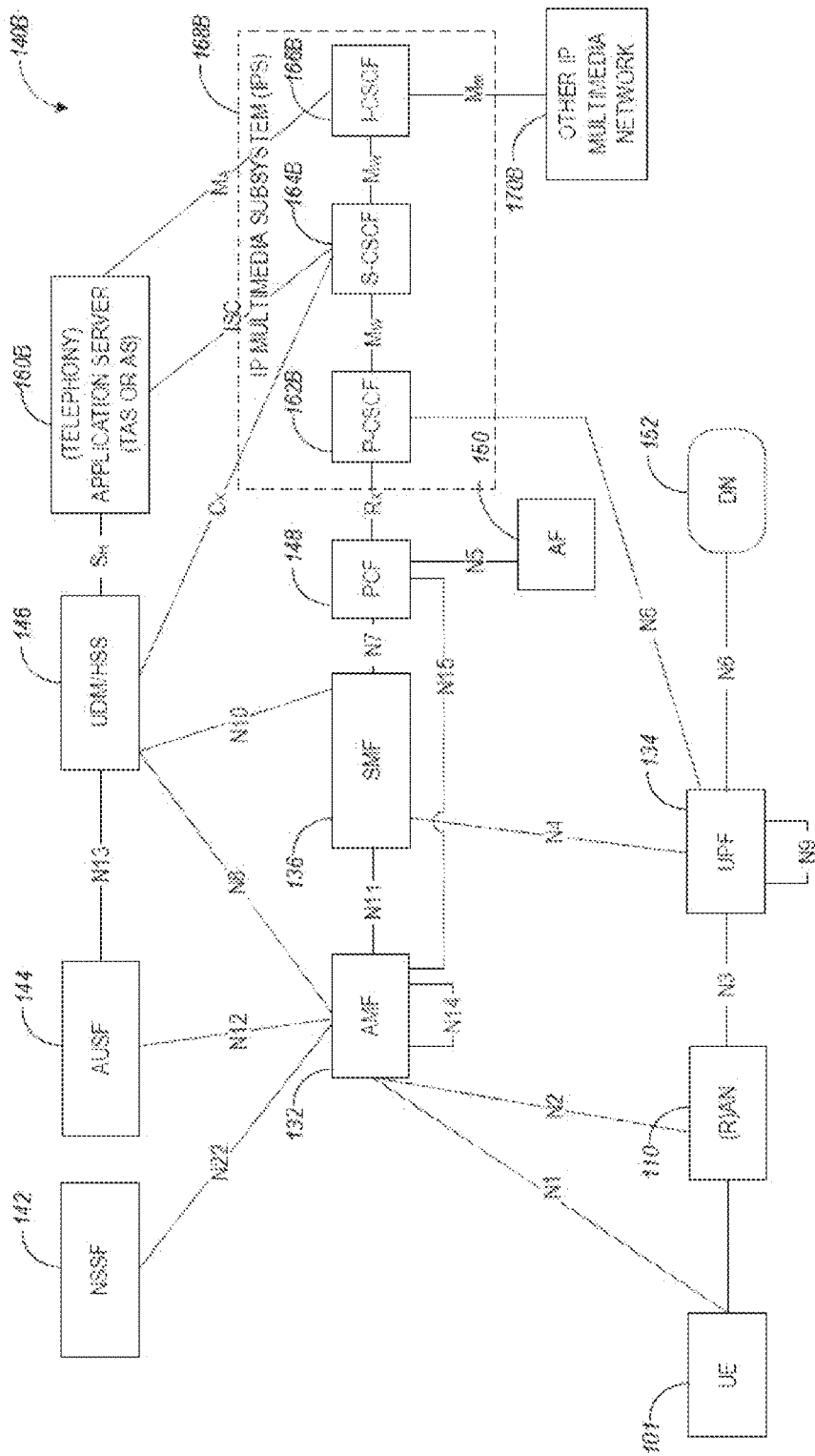
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
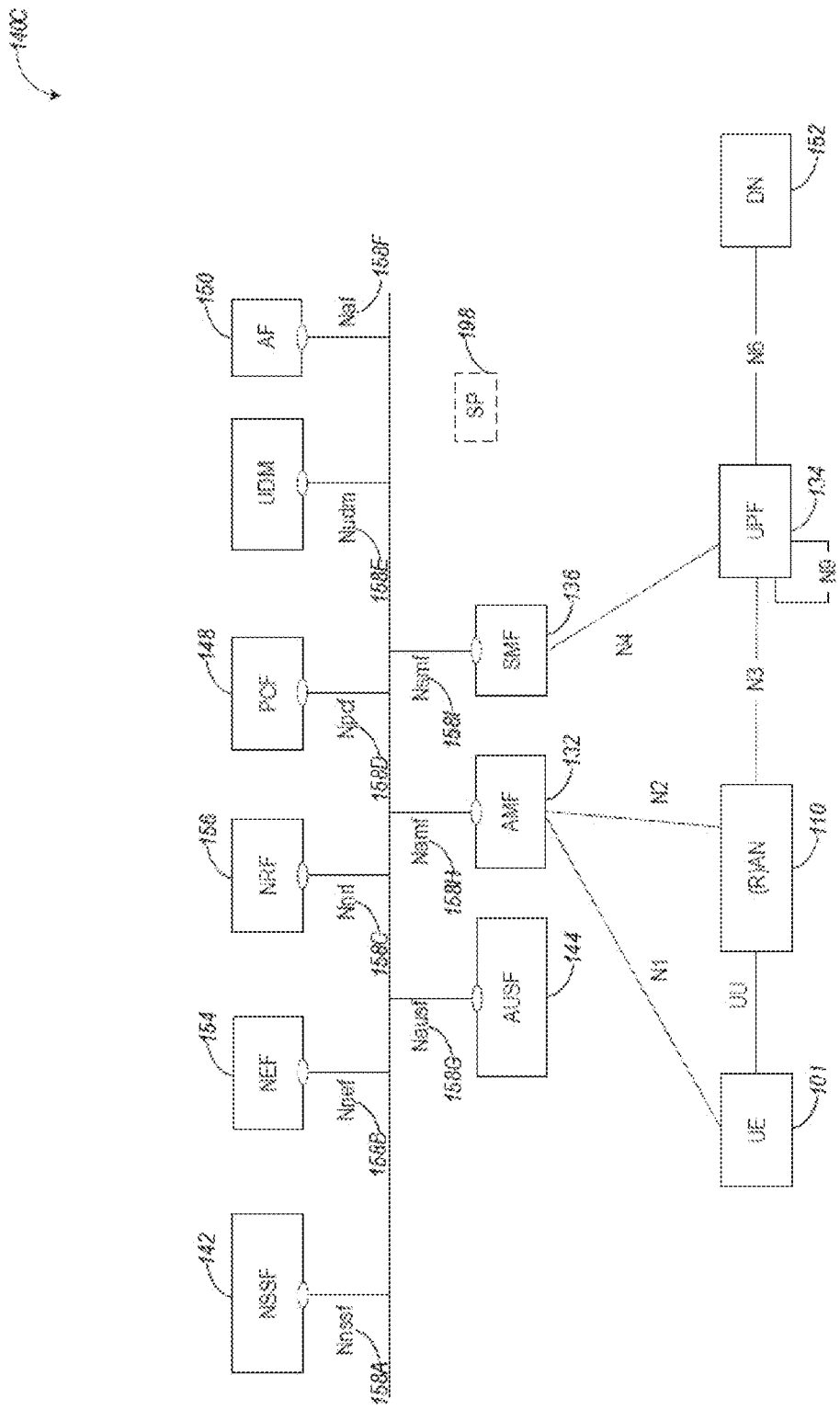
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces. Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
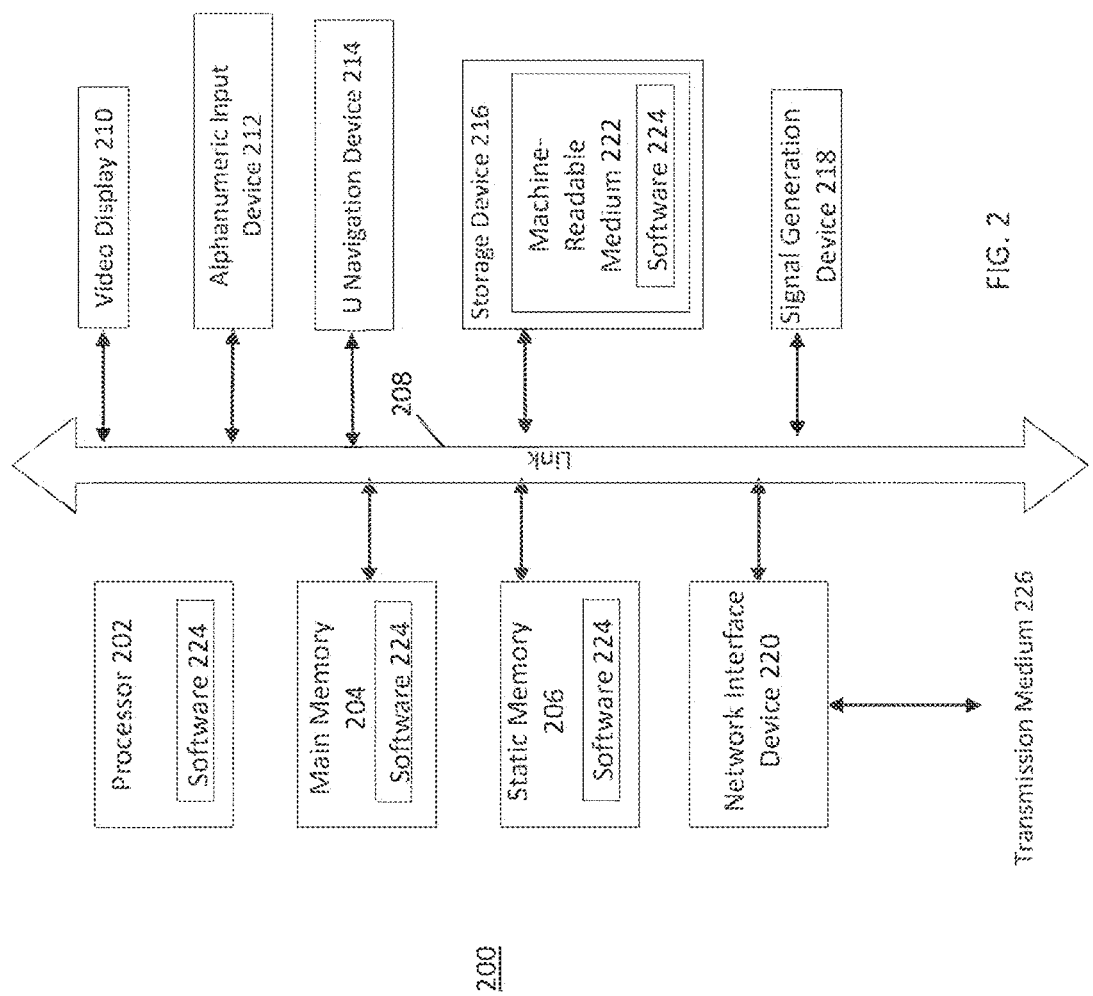
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Figure 3:
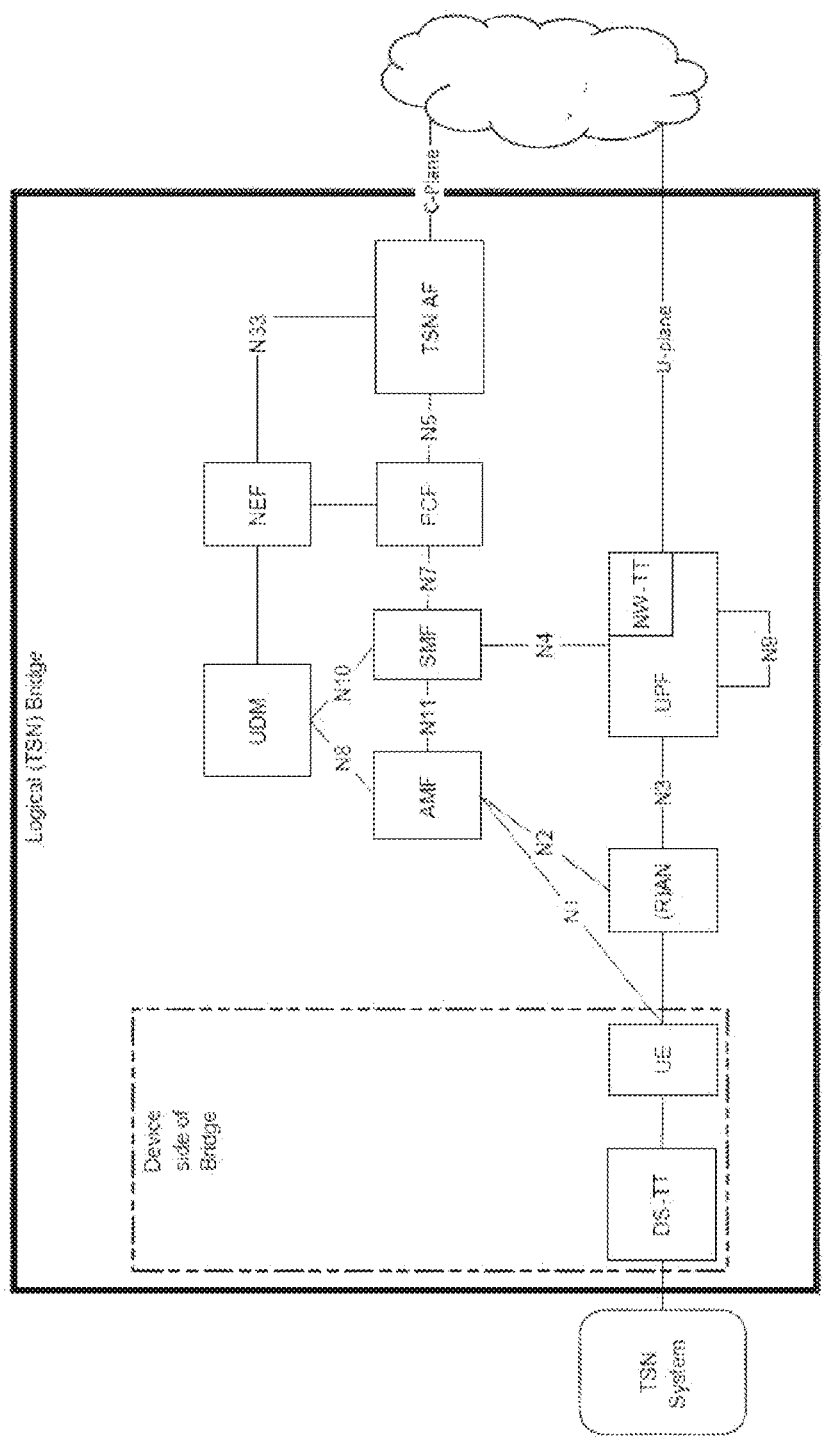
FIG. 3 illustrates a system architecture view in accordance with some embodiments.

FIG. 3 illustrates a system architecture view in accordance with some embodiments. In particular, FIG. 3 illustrates an example of the architecture for support of IEEE time sensitive networking (TSN) in the 5G system. In some embodiments, the 5G system may be integrated with the external network as a TSN bridge. This "logical" TSN bridge includes TSN Translator functionality for interoperation between TSN System and 5G System both for user plane and control plane. 5GS TSN translator functionality consists of a DS-TT and a NW-TT.

Figure 4:
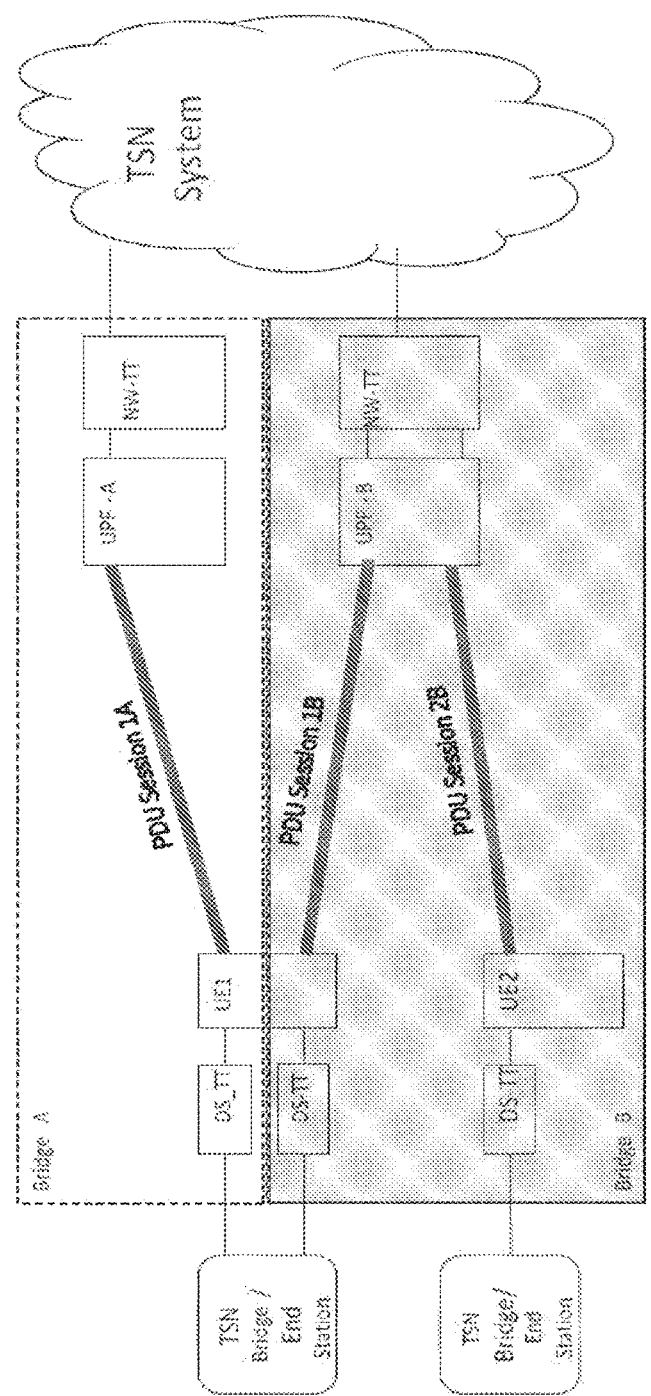
FIG. 4 illustrates per user plane function in accordance with some embodiments.
Figure 5:
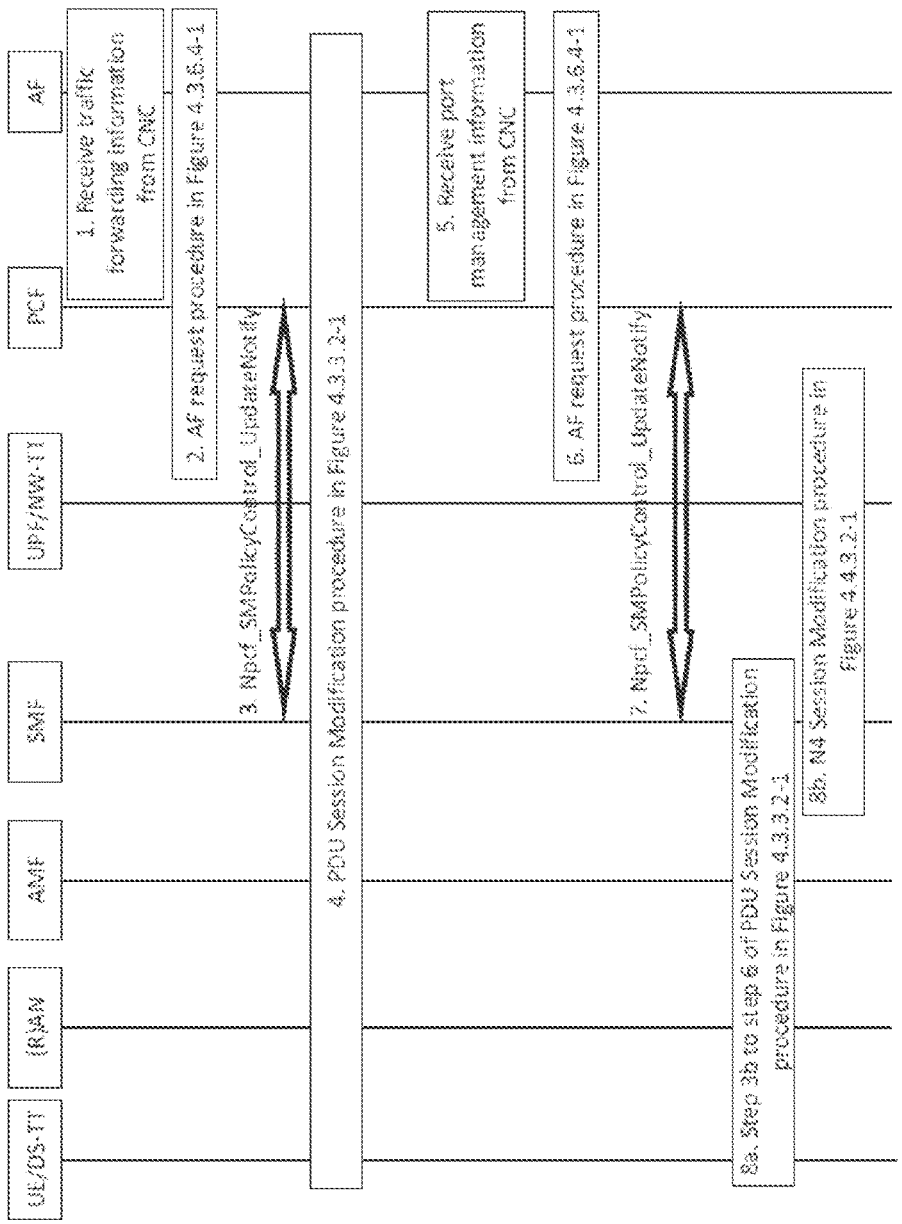
FIG. 5 illustrates 5G bridge information configuration in accordance with some embodiments.

FIG. 4 illustrates per user plane function in accordance with some embodiments. As shown in FIG. 4, the 5GS can support multiple logical TSN bridges. A logical TSN bridge may be defined on per-UPF basis. In this case, the following applies: all DS-TTs belonging to the same logical TSN bridge are connected to the same UPF via PDU Sessions; one UE can connect to multiple logical TSN bridges (e.g. UE1 in FIG. 4), however the UE may have distinct DS-TT ports; a NW-TT can have multiple Ethernet ports (referred to as NW-TT ports); and the procedure for TSN bridge configuration is described in TS 23.502, v.16.5.0, 2020-07-09 Annex F.1 and Annex F.2, as in the excerpt below and shown in FIG. 5, which illustrates 5G bridge information configuration in accordance with some embodiments:

F.2 5GS Bridge Configuration

For 5GS integrating with fully-centralized model TSN network, the centralized network configuration (CNC) provides TSN information to the AF.

1. CNC provides TSN information according to IEEE 802.1Q, Jul. 6, 2018, clause 8.6.5.1 to AF to derive TSN QoS information and related flow information.

The CNC provides the forwarding rule to AF according to IEEE 802.1Q. The TSN AF uses this information to identify the DS-TT MAC address of corresponding PDU session.

2. The AF determines the MAC address of a PDU Session based on the previous stored associations, then triggers an AF request procedure. The AF request includes the DS-TT MAC address of the PDU session.

Based on the information received from the CNC, 5GS bridge delay information and the UE-DS-TT residence time, the TSN AF determines the TSN QoS information and time sensitive communication (TSC) Assistance Container for TSN streams and sends them to the PCF. The TSN AF also provides Service Data Flow Filter containing Flow description also includes Ethernet Packet Filters.

3. When PCF receives the AF request, the PCF finds the correct SMF based on the DS-TT MAC address of the PDU session and notifies the SMF via Npcf_SMPolicyControl_UpdateNotify message.

After mapping the received TSN QoS parameters for TSN streams to 5GS QoS, the PCF triggers Npcf_SMPolicyControl_UpdateNotify message to update the PCC rule to the SMF. The PCC rule includes the Ethernet Packet Filters, the 5GS QoS profile along with TSC Assistance Container.

4. SMF may trigger the PDU Session Modification procedure to establish/modify a QoS Flow to transfer the TSN streams. During this procedure, the SMF provides the information received in PCC rules to the UPF via N4 Session Modification procedure.

Upon reception of TSC Assistance Container, the SMF determine the TSCAI for QoS flow and sends the TSCAI along with the QoS profile to the NG RAN.

5. If needed, the CNC provides additional information (e.g. the gate control list as defined in IEEE 802.1 Qbv) to the TSN AF.

6. The AF determines the MAC address of a PDU Session for the configured port based on the previous stored associations, this is used to deliver the Port Management information to the correct SMF that manages the port via PCF. The AF triggers an AF request procedure. The AF request includes the DS-TT MAC address (e.g., the MAC address of the PDU Session), TSN QoS Parameters, Port Management information Container and the related port number as defined in clause 5.28.3 of TS 23.501. The port number is used by SMF to decide whether the configured port is in DS-TT or NW-TT.

7. The PCF determines the SMF based on the MAC address received in the AF request, the PCF maps the TSN QoS information provided by the AF to PCC rules as described in clause 5.28.4 in TS 23.501, v. 16.5.0, 2020-07-09. The PCF includes the TSC Assistance Container received from the AF with the PCC rules and forwards it to the SMF. The PCF transparently transports the received Port Management information Container and related port number to SMF via Npcf_SMPolicyControl_UpdateNotify message.

8a. If the SMF decides the port is on DS-TT based on the received port number, the SMF transports the received Port Management information Container to the UE/DS-TT in PDU Session Modification Request message.

8b. If the SMF decides the port is on NW-TT based on the received port number, the SMF transports the received Port Management information Container to the UPF/NW-TT in N4 Session Modification Request message. SMF provides the Ethernet Packet Filters as part of the N4 Packet Detection rule to the UPF/NW-TT.

If the UPF sends a Clock Drift Report to the SMF as described in clause 5.27.2 in TS 23.501, the SMF adjusts the Burst Arrival Time and Periodicity from a TSN clock to the 5G clock and sends the updated TSCAI to NG-RAN.

As part of step 8a (PDU Session Modification procedure) the SMF delivers a Port information Management Container (PMIC) to the DS-TT. The PMIC format is defined in TS 23.501 Table 5.28.3.1-1 (copied below):

| | Applicability (see Note 6) | | Supported operations by | |
|---|---|---|---|---|
| Port management information | DS-TT | NW-TT | TSN AF (see Note 1) | Reference |
| General | | | | |
| Port management capabilities (see Note 2) | X | X | R | |
| Bridge delay related information | | | | |
| txPropagationDelay | X | X | R | IEEE 802.1Qcc [95] clause 12.32.2.1 |
| Traffic class related information | | | | |
| Traffic class table | X | X | RW | IEEE 802.1Q [98] clause 12.6.3 and clause 8.6.6. |
| Gate control information | | | | |
| GateEnabled | X | X | RW | IEEE 802.1Q [98] Table 12-29 |
| AdminBaseTime | X | X | RW | IEEE 802.1Q [98] Table 12-29 |
| AdminControlList | X | X | RW | IEEE 802.1Q [98] Table 12-29 |
| AdminCycleTime (see Note 3) | X | X | RW | IEEE 802.1Q [98] Table 12-29 |
| AdminControlListLength (see Note 3) | X | X | RW | IEEE 802.1Q [98] Table 12-28 |
| Tick granularity | X | X | R | IEEE 802.1Q [98] Table 12-29 |

-continued

| Port management information | Applicability (see Note 6) DS-TT | Applicability (see Note 6) NW-TT | Supported operations by TSN AF (see Note 1) | Reference |
|---|---|---|---|---|
| General Neighbor discovery configuration (NOTE 4) | | | | |
| adminStatus | D | X | RW | IEEE 802.1AB [97] clause 9.2.5.1 |
| IldpV2LocChassisIdSubtype | D | X | RW | IEEE 802.1AB [97] Table 11-2 |
| IldpV2LocChassisId | D | X | RW | IEEE 802.1AB [97] Table 11-2 |
| IldpV2MessageTxInterval | D | X | RW | IEEE 802.1AB [97] Table 11-2 |
| IldpV2MessageTxHoldMultiplier | D | X | RW | IEEE 802.1AB [97] Table 11-2 |
| NW-TT port neighbor discovery configuration | | | | |
| IldpV2LocPortIdSubtype | | X | RW | IEEE 802.1AB [97] Table 11-2 |
| IldpV2LocPortId | | X | RW | IEEE 802.1AB [97] Table 11-2 |
| DS-TT port neighbor discovery configuration | | | | |
| IldpV2LocPortIdSubtype | D | | RW | IEEE 802.1AB [97] Table 11-2 |
| IldpV2LocPortId | D | | RW | IEEE 802.1AB [97] Table 11-2 |
| Neighbor discovery information for each discovered neighbor of NW-TT | | | | |
| IldpV2RemChassisIdSubtype | | X | R | IEEE 802.1AB [97] Table 11-2 |
| IldpV2RemChassisId | | X | R | IEEE 802.1AB [97] Table 11-2 |
| IldpV2RemPortIdSubtype | | X | R | IEEE 802.1AB [97] Table 11-2 |
| IldpV2RemPortId | | X | R | IEEE 802.1AB [97] Table 11-2 |
| TTL | | X | R | IEEE 802.1AB [97] clause 8.5.4 |
| Neighbor discovery information for each discovered neighbor of DS-TT (NOTE 5) | | | | |
| IldpV2RemChassisIdSubtype | D | | R | IEEE 802.1AB [97] Table 11-2 |
| IldpV2RemChassisId | D | | R | IEEE 802.1AB [97] Table 11-2 |
| IldpV2RemPortIdSubtype | D | | R | IEEE 802.1AB [97] Table 11-2 |
| IldpV2RemPortId | D | | R | IEEE 802.1AB [97] Table 11-2 |
| TTL | D | | R | IEEE 802.1AB [97] clause 8.5.4.1 |
| Per-Stream Filtering and Policing information (NOTE 10) | | | | |
| Stream Filter Instance Table (NOTE 8) | | | | IEEE 802.1Q [98] Table 12-32 |
| StreamHandleSpec | X | X | RW | IEEE 802.1Q [98] Table 12-32 |
| PrioritySpec | X | X | RW | IEEE 802.1Q [98] Table 12-32 |
| StreamGateInstanceID | X | X | RW | IEEE 802.1Q [98] Table 12-32 |
| Stream Gate Instance Table (NOTE 9) | | | | IEEE 802.1Q [98] Table 12-33 |
| StreamGateInstance | X | X | R | IEEE 802.1Q [98] Table 12-33 |
| PSFPAdminBaseTime | X | X | RW | IEEE 802.1Q [98] Table 12-33 |

-continued

| Port management information | Applicability (see Note 6) | | Supported operations by | Reference |
|---|---|---|---|---|
| | DS-TT | NW-TT | TSN AF (see Note 1) | |
| PSFPAdminControlList | X | X | RW | IEEE 802.1Q [98] Table 12-33 |
| PSFPAdminCycleTime | X | X | RW | IEEE 802.1Q [98] Table 12-33 |
| PSFPTickGranularity | X | X | R | IEEE 802.1Q. [98] Table 12-33 |

NOTE 1:
R = Read only access; RW = Read/Write access.
NOTE 2:
Indicates which standardized and deployment-specific port management information is supported by DS-TT or NW-TT.
NOTE 3:
AdminCycleTime and AdminControlListLength are optional for gate control information.
NOTE 4:
If DS-TT supports neighbor discovery, then TSN AF sends the general neighbor discovery configuration for DS-TT Ethernet ports to DS-TT. If DS-TT does not support neighbor discovery, then TSN AF sends the general neighbor discovery configuration for DS-TT Ethernet ports to NW-TT using the Bridge Management Information Container (refer to Table 5.28.3.1-2) and NW-TT performs neighbor discovery on behalf on DS-TT.
NOTE 5
If DS-TT supports neighbor discovery, then TSN AF retrieves neighbor discovery information for DS-TT Ethernet ports from DS-TT. If DS-TT does not support neighbor discovery, then TSN AF retrieves neighbor discovery information for DS-TT Ethernet ports from NW-TT using the Bridge Management Information Container (refer to Table 5.28.3.1-2), the NW-TT performing neighbor discovery on behalf on DS-TT.
NOTE 6:
X = applicable; D = applicable when validation and generation of LLDP frames is processed at the DS-TT.
NOTE 7:
Void.
NOTE 8:
There is a Stream Filter Instance Table per Stream.
NOTE 9:
There is a Stream Gate Instance Table per Gate.
NOTE 10:
The use of PSFP information is mandatory at the TSN AF and is optional at both DS-TT and NW-TT. TSN AF uses the PSFP information at TSN bridge configuration time to identify the DS-TT MAC address of the PDU Session as described in clause 5.28.2 and for determination of the traffic pattern information as described in Annex I. The PSFP information can be used at the DS-TT (if supported) and at the NW-TT (if supported) for the purpose of per-stream filtering and policing as defined in IEEE 802.1Q [98] clause 8.6.5.1.

The Per-Stream Policing and Filtering (PSFP) information is provided optionally to the DS-TT port and NW-TT port for the purpose of performing ingress policing (e.g., checking whether incoming traffic streams (UL and DL frames for DS-TT and NW-TT, respectively) are compliant with the expected TSN stream pattern, as indicated in NOTE 10 in the table above.

Multiple TSN streams can enter the TSN bridge through the same ingress (DS-TT or NW-TT) port. The PSFP function is applied on per-TSN stream basis. When a frame arrives at the ingress port, the latter needs to identify the TSN stream to which the frame belongs.

According to IEEE 802.1Q, the StreamHandleSpec parameter (see the table above) is set to a stream_handle value which is further specified in IEEE 802.1CB as follows:

A stream_handle specification. This can be either of the following:
1) A single stream_handle value, as specified in IEEE Std 802.1CB, Oct. 27, 2017; or
2) A wild-card value that matches any stream_handle value According to IEEE 802.1CB the stream_handle value refers to a tsnStreamIdEntry object in the Stream identity table. A tsnStreamIdEntry object relates to a single Stream and includes tsnStreamIdEntry objects each describing a single identification method:

9.1 Stream Identity Table

The Stream identity table consists of a set of tsnStreamIdEntry objects (9.1.1), each relating to a single Stream, specifying the points in the system where Stream identification functions (6.2) are to be instantiated. Each entry in the Stream identity table has a tsnStreamIdHandle object (9.1.1.1) specifying a stream_handle value and one or more tsnStreamIdEntry objects (9.1.1) describing one identification method for that Stream. If a single Stream has multiple identification methods, perhaps (but not necessarily) on different ports, then there can be multiple tsnStreamIdEntry objects with the same value for the tsnStreamIdHandle. If the HSR or PRP method or the Sequence encode/decode function is applied to a packet, then the LanId or PathId fields are also used to identify the Stream to which the packet belongs.

IEEE 802.1CB defines several ways for stream identification e.g. based on the combination of Source MAC address and VLAN tag, or based on the Destination MAC address and VLAN tag. Those are used by the tsnStreamIdEntry objects:

| IEEE 802.1CB Table 9-1—Stream identification types | | | |
|---|---|---|---|
| OUI/CID | Type number | Stream identification function | Controlling parameters |
| 00-80-C2 | 0 | Reserved | — |
| 00-80-C2 | 1 | Null Stream identification (6.4) | 9.1.2 |
| 00-80-C2 | 2 | Source MAC and VLAN Stream identification (6.5) | 9.1.3 |
| 00-80-C2 | 3 | Active Destination MAC and VLAN Stream identification (6.6) | 9.1.4 |
| 00-80-C2 | 4 | IP Stream identification (6.7) | 9.1.5 |
| 00-80-C2 | 5-255 | Reserved | — |

IEEE 802.1CB Table 9-1—Stream identification types

| OUI/CID | Type number | Stream identification function | Controlling parameters |
|---|---|---|---|
| other | — | Defined by entity owning the OUI or CID | — |

The StreamHandleSpec only refers to a tsnStreamIdEntry object in the Stream identity table which is not available in the DS-TT and NW-TT. However, the identification of an individual TSN stream requires information related to the "Stream identification function" and the "Controlling parameters" as referred in the table above. Unless this information (e.g., Type number, Source MAC address, Dest MAC address, VLAN ID) is signaled from the CNC to the DS-TT and NW-TT as part of the PSFP information, the DS-TT and NW-TT will not be able to identify the individual TSN streams.

In a centralized TSN bridge it can be assumed that there is a central repository containing the definition of all TSN streams traversing the TSN bridge. When a frame arrives at the ingress port, the latter can consult the central repository.

However, in a distributed TSN bridge, like the one emulated by the 5GS, the DS-TT has no access to such a centralized repository. For NW-TT the situation is slightly different because, being located inside the UPF, the NW-TT may be able to get access to the central repository in which case the NW-TT would only need to be provided with some reference (a handle) that points to the stored definition of the TSN stream. However, for the sake of symmetry it is proposed to consider here a symmetric solution that applies to both NW-TT and DS-TT ports. To enable the DS-TT and NW-TT to perform the PSFP function, some embodiments may be directed to allowing the DS-TT and NW-TT to obtain the definition of the TSN streams.

The current PMIC definition in the TS 23.501 Table is incomplete because it does not allow the DS-TT or NW-TT port to learn the TSN stream definition for identifying TSN streams on which it should apply the PSFP function. Some embodiments of this disclosure may include modifications to the PMIC definition to allow the DS-TT or NW-TT port to obtain the TSN stream definitions. The current incomplete Rel-16 specification helps to prevent deployment the PSFP functionality at the ingress ports, which may be addressed by embodiments of the present disclosure.

Embodiments of the present disclosure may include the definition of a TSN stream in the PMIC described in modifications to the TS 23.501 Table 5.28.3.1-1, as illustrated below:

| Port management information | Applicability (see Note 6) | | Supported operations by | Reference |
|---|---|---|---|---|
| | DS-TT | NW-TT | TSN AF (see Note 1) | |
| General | | | | |
| Port management capabilities (see Note 2) | X | X | R | |
| Bridge delay related information | | | | |
| txPropagationDelay | X | X | R | IEEE 802.1Qcc [95] clause 12.32.2.1 |
| Traffic class related information | | | | |
| Traffic class table | X | X | RW | IEEE 802.1Q [98] clause 12.6.3 and clause 8.6.6. |
| Gate control information | | | | |
| GateEnabled | X | X | RW | IEEE 802.1Q [98] Table 12-29 |
| AdminBaseTime | | X | RW | IEEE 802.1Q [98] Table 12-29 |
| AdminControlList | | X | RW | IEEE 802.1Q [98] Table 12-29 |
| AdminCycle Time (see Note 3) | X | X | RW | IEEE 802.1Q [98] Table 12-29 |
| AdminControlListLength (see Note 3) | X | X | RW | IEEE 802.1Q [98] Table 12-28 |
| Tick granularity | X | X | R | IEEE 802.1Q [98] Table 12-29 |
| General Neighbor discovery configuration (NOTE 4) | | | | |
| adminStatus | D | X | RW | IEEE 802.1AB [97] clause 9.2.5.1 |
| IldpV2LocChassisIdSubtype | D | X | RW | IEEE 802.1AB [97] Table 11-2 |
| IldpV2LocChassisId | D | X | RW | IEEE 802.1AB [97] Table 11-2 |
| IldpV2MessageTxInterval | D | X | RW | IEEE 802.1AB [97] Table 11-2 |
| IldpV2MessageTxHoldMultiplier | D | X | RW | IEEE 802.1AB [97] Table 11-2 |

-continued

| Port management information | Applicability (see Note 6) DS-TT | Applicability (see Note 6) NW-TT | Supported operations by TSN AF (see Note 1) | Reference |
|---|---|---|---|---|
| NW-TT port neighbor discovery configuration | | | | |
| IldpV2LocPortIdSubtype | | X | RW | IEEE 802.1AB [97] Table 11-2 |
| IldpV2LocPortId | | X | RW | IEEE 802.1AB [97] Table 11-2 |
| DS-TT port neighbor discovery configuration | | | | |
| IldpV2LocPortIdSubtype | D | | RW | IEEE 802.1AB [97] Table 11-2 |
| IldpV2LocPortId | D | | RW | IEEE 802.1AB [97] Table 11-2 |
| Neighbor discovery information for each discovered neighbor of NW-TT | | | | |
| IldpV2RemChassisIdSubtype | | X | R | IEEE 802.1AB [97] Table 11-2 |
| IldpV2RemChassisId | | X | R | IEEE 802.1AB [97] Table 11-2 |
| IldpV2RemPortIdSubtype | | X | R | IEEE 802.1AB [97] Table 11-2 |
| IldpV2RemPortId | | X | R | IEEE 802.1AB [97] Table 11-2 |
| TTL | | X | R | IEEE 802.1AB [97] clause 8.5.4 |
| Neighbor discovery information for each discovered neighbor of DS-TT (NOTE 5) | | | | |
| IldpV2RemChassisIdSubtype | D | | R | IEEE 802.1AB [97] Table 11-2 |
| IldpV2RemChassisId | D | | R | IEEE 802.1AB [97] Table 11-2 |
| IldpV2RemPortIdSubtype | D | | R | IEEE 802.1AB [97] Table 11-2 |
| IldpV2RemPortId | D | | R | IEEE 802.1AB [97] Table 11-2 |
| TTL | D | | R | IEEE 802.1AB [97] clause 8.5.4.1 |
| Per-Stream Filtering and Policing information (NOTE 10) | | | | |
| Stream Filter Instance Table (NOTE 8) | | | | IEEE 802.1Q [98] Table 12-32 |
| >Stream Identification type | X | X | RW | IEEE 802.1CB clause 9.1.1.6 |
| >Stream Identification Controlling Parameters | X | X | RW | IEEE 802.1CB clause 9.1.2, 9.2.3, 9.1.4, 9.1.5 (NOTE 11) |
| >PrioritySpec | X | X | RW | IEEE 802.1Q [98] Table 12-32 |
| >StreamGateInstanceID | X | X | RW | IEEE 802.1Q [98] Table 12-32 |
| Stream Gate Instance Table (NOTE 9) | | | | IEEE 802.1Q [98] Table 12-33 |
| StreamGateInstance | X | X | R | IEEE 802.1Q [98] Table 12-33 |
| PSFPAdminBaseTime | X | X | RW | IEEE 802.1Q [98] Table 12-33 |
| PSFPAdminControlList | X | X | RW | IEEE 802.1Q [98] Table 12-33 |

|                              | Applicability (see Note 6) | | Supported operations by | |
| --- | --- | --- | --- | --- |
| Port management information  | DS-TT | NW-TT | TSN AF (see Note 1) | Reference |
| PSFPAdminCycleTime           | X | X | RW | IEEE 802.1Q [98] Table 12-33 |
| PSFPTickGranularity          | X | X | R  | IEEE 802.1Q [98] Table 12-33 |

NOTE 1:
R = Read only access; RW = Read/Write access.
NOTE 2:
Indicates which standardized and deployment-specific port management information is supported by DS-TT or NW-TT.
NOTE 3:
AdminCycle Time and AdminControlListLength are optional for gate control information.
NOTE 4:
If DS-TT supports neighbor discovery, then TSN AF sends the general neighbor discovery configuration for DS-TT Ethernet ports to DS-TT. If DS-TT does not support neighbor discovery, then TSN AF sends the general neighbor discovery configuration for DS-TT Ethernet ports to NW-TT using the Bridge Management Information Container (refer to Table 5.28.3.1-2) and NW-TT performs neighbor discovery on behalf on DS-TT.
NOTE 5:
If DS-TT supports neighbor discovery, then TSN AF retrieves neighbor discovery information for DS-TT Ethernet ports from DS-TT. If DS-TT does not support neighbor discovery, then TSN AF retrieves neighbor discovery information for DS-TT Ethernet ports from NW-TT using the Bridge Management Information Container (refer to Table 5.28.3.1-2), the NW-TT performing neighbor discovery on behalf on DS-TT.
NOTE 6:
X = applicable; D = applicable when validation and generation of LLDP frames is processed at the DS-TT.
NOTE 7:
Void.
NOTE 8:
There is a Stream Filter Instance Table per Stream.
NOTE 9:
There is a Stream Gate Instance Table per Gate.
NOTE 10:
The use of PSFP information is mandatory at the TSN AF and is optional at both DS-TT and NW-TT. TSN AF uses the PSFP information at TSN bridge configuration time to identify the DS-TT MAC address of the PDU Session as described in clause 5.28.2 and for determination of the traffic pattern information as described in Annex I. The PSFP information can be used at the DS-TT (if supported) and at the NW-TT (if supported) for the purpose of per-stream filtering and policing as defined in IEEE 802.1Q [98] clause 8.6.5.1.
NOTE 11:
The set of Stream Identification Controlling Parameters depends on the Stream Identification type value as defined in IEEE 802.1CB Table 9-1 and clauses 9.2, 9.3, 9.4. 9.5.

Figure 6:
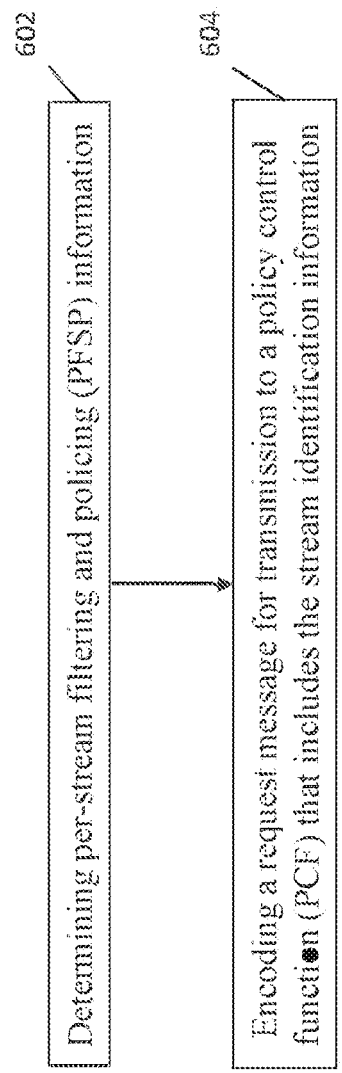
FIG. 6 illustrates a stream identification information process in accordance with some embodiments.

FIG. 6 illustrates a stream identification information process in accordance with some embodiments. The process depicted in FIG. 6 may be performed by an application function (AF) in some embodiments. For example, the process may include, at operation 602, determining per-stream filtering and policing (PSFP) information. The process may further include, at operation 604, encoding a request message for transmission to a policy control function (PCF) that includes the stream identification information. The PSFP information may be used to configure a TSN logical bridge in a 5G system.

The PSFP information may include a variety of different parameters. For example, the PSFP information may include a stream identification type. In some embodiments, the PSFP information may include one or more stream identification controlling parameters. For example, the one or more stream identification controlling parameters may include: a source MAC address, a destination MAC address, an IP source address, an IP destination address, a source port, a destination port, a VLAN identifier, or a wildcard value.

In some embodiments, at least one of the one or more stream identification controlling parameters may be determined based on traffic forwarding information received from a CNC. For example, in some embodiments a MAC address of a PDU session is determined based on the traffic forwarding information.

Figure 7:
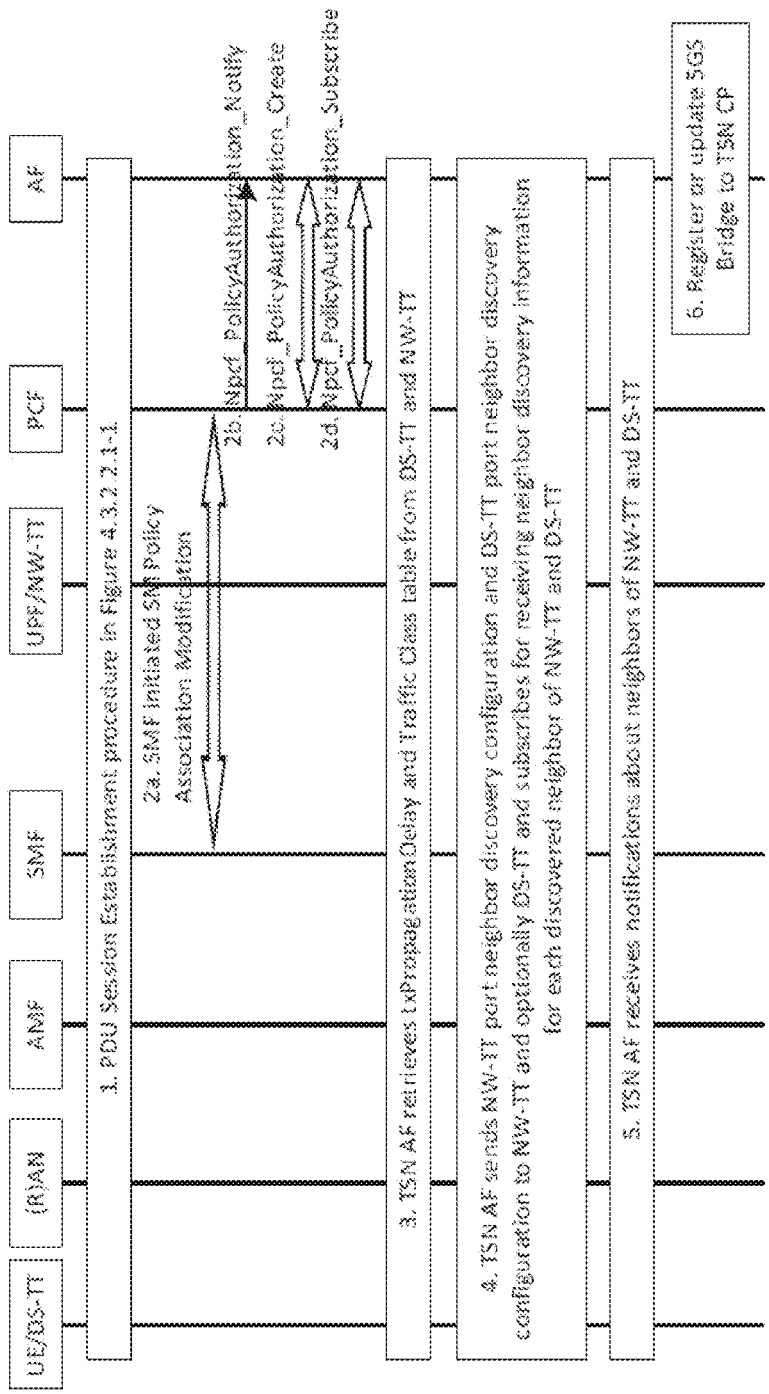
FIG. 7 illustrates 5G bridge information reporting in accordance with some embodiments.

The procedure for TSN bridge configuration as currently described in TS 23.502 Annex F.1 and Annex F.2 consists of two phases: 5GS Bridge information reporting (Annex F.1) and 5GS Bridge configuration proper (Annex F.2). FIG. 7 illustrates 5G bridge information reporting in accordance with some embodiments.

F.1 5GS Bridge Information Reporting

Identities of 5GS Bridge and UPF/NW-TT ports are pre-configured on the UPF based on deployment. The SMF requests the UPF/NW-TT to measure and report the clock drift between the TSN GM time and 5GS GM time for one or more TSN working domains.

1. PDU Session Establishment as defined clause 4.3.2.2.1-1 is used to establish a PDU Session serving for TSC.

During this procedure, the SMF selects a UPF, which supports functions as defined in clause 5.28.1 of TS 23.501, for the PDU Session.

During this procedure, the SMF receives the UE-DS-TT residence time, DS-TT MAC address for this PDU Session and port management capabilities from the DS-TT/UE in PDU Session Establishment request, and receives the allocated port number for DS-TT Ethernet port, port number(s) for the serving NW-TT Ethernet port(s) and Bridge ID in N4 Session Establishment Response message. The UPF allocates the port number for DS-TT and decides port number for NW-TT, Bridge ID after receiving N4 Session Establishment Request message.

2. The SMF sends the information received in step 1 to the TSN AF via PCF to establish/modify the 5GS Bridge. The Npcf PolicyAuthorization_Notify message in step 2b is delivered via the pre-configured AF session as described in clause 4.16.5.1. The TSN AF stores the binding relationship between 5GS Bridge ID, MAC address of the DS-TT Ethernet port, the port number of the DS-TT Ethernet port, port numbers of NW-TT Ethernet ports for the 5GS Bridge and also updates 5GS bridge delay as defined in clause 5.27.5 of TS 23.501 for future configuration. The TSN AF requests creation of a new AF session associated with the MAC address of the DS-TT Ethernet port using the_Npcf PolicyAuthorization_Create operation (step 2c) and subscribes for TSN events over the newly created AF session using the Npcf PolicyAuthorization_Subscribe operation (step 2d).

Of particular interest here are steps 2b, 2c and 2d.

When the UE/DS-TT establishes a PDU Session, there is no AF session available between the PCF and the TSN AF. Because of that, the Port Information Management Container (PMIC) sent by the UE/DS-TT in the PDU Session Establishment Request is delivered using the Npcf_PolicyAuthorization_Notify message on a pre-configured AF session (step 2b).

NOTE: Before the introduction of TSN bridge support in the 5G System, all sessions on the PCF-AF interface (N5) used to be specific to a PDU Session. With the introduction of TSN bridge support the notion of a "pre-configured AF session" was introduced that is not PDU Session specific. This pre-configured AF session is typically used for delivery of PMIC and/or BM IC (Bridge Management Information Container) information before a PDU Session-specific AF session is created.

Triggered by the_Npcf_PolicyAuthorization Notfy message the TSN AF requests establishment of a PDU Session-specific AF session (step 2c) using the_Npcf_PolicyAuthorization Create operation, after which the TSN AF subscribes for receiving TSN Bridge related information on the PDU Session-specific AF session (step 2d) using the Npcf_PolicyAuthorization_Subscribe operation.

Step 2d is performed for all PDU Session-specific AF sessions, meaning that the TSN AF is able to receive TSN bridge related information over any of the PDU Session-specific AF sessions.

The information of TSN bridge information is conveyed transparently:
1. Between the TSN AF and a DS-TT port, in which case it consists of DS-TT PMICs.
2. Between the TSN AF and a NW-TT port, in which case it consists of NW-TT PMICs.
3. Between the TSN AF and the NW-TT (as a whole), in which case it consists of BMICs.

For the PMIC and BMIC formats the reader can refer to TS 23.501 Table 5.28.3.1-1 and 5.28.3.1-2, respectively.

The DS-TT PMIC is exchanged using the PDU Session-specific AF session.

Figure 8:
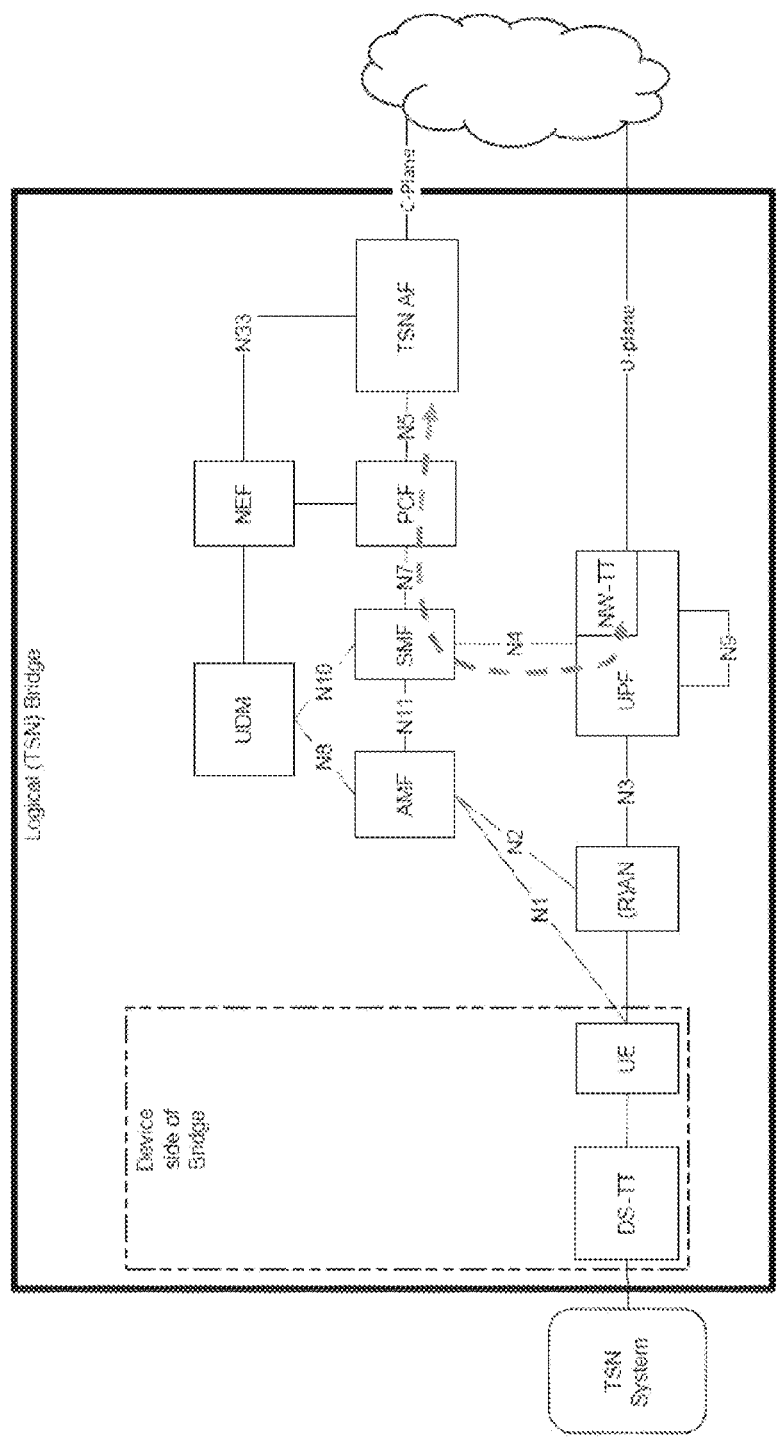
FIG. 8 illustrates a transport path between the Device-side TSN translator (DS-TT) and Network-side TSN translator (NW-TT) in accordance with some embodiments.

FIG. 8 illustrates a transport path between the Device-side TSN translator (DS-TT) and Network-side TSN translator (NW-TT) in accordance with some embodiments. As illustrated in FIG. 8, the exchange of NW-TT PMICs and BMICs follows the N4-N7-N5 path.

Figure 9:
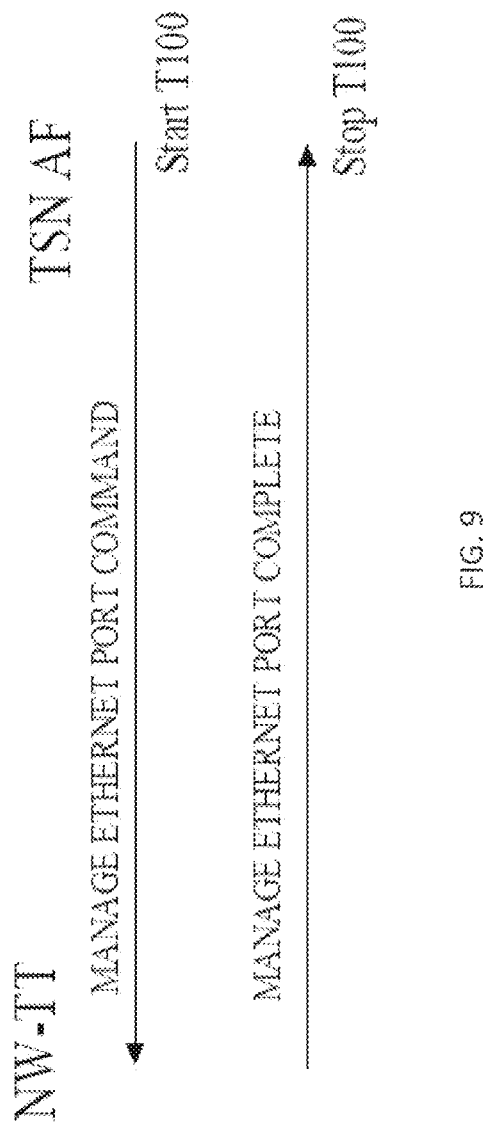
FIG. 9 illustrates a TSN application function (AF)-requested Ethernet port management procedure in accordance with some embodiments.
Figure 10:
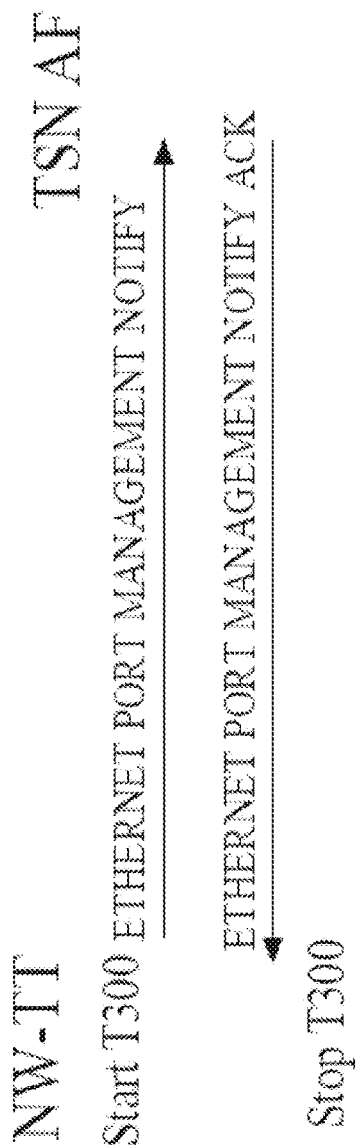
FIG. 10 illustrates a NW-TT-initiated Ethernet port management procedure in accordance with some embodiments.
Figure 11:
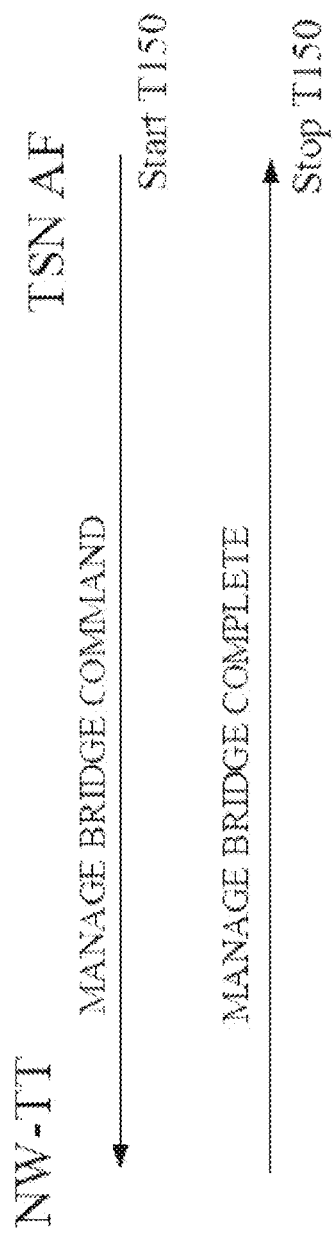
FIG. 11 illustrates a TSN AF-requested bridge management procedure in accordance with some embodiments.
Figure 12:
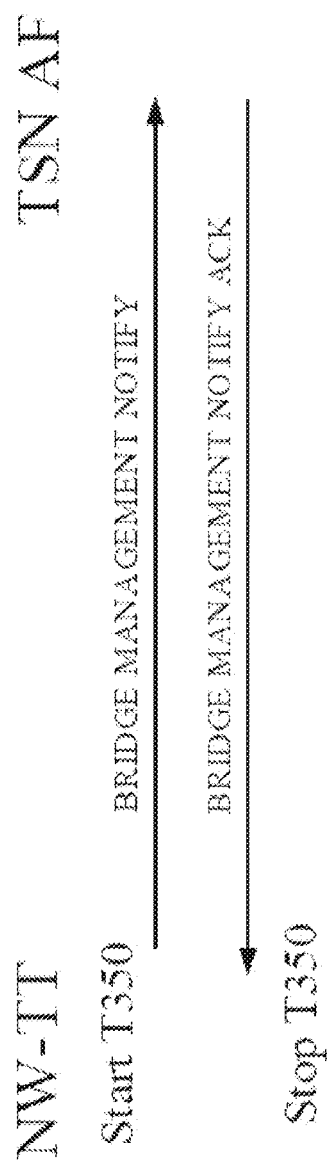
FIG. 12 illustrates a NW-TT-initiated bridge management procedure in accordance with some embodiments.

As defined in TS 24.519 the exchange of containers is initiated by the TSN-AF using the TSN AF-requested Ethernet port management procedure or the TSN AF-requested Bridge management procedure for the purpose of NW-TT parameter subscription, setting NW-TT parameters, or reading NW-TT parameters. Once the TSN AF has subscribed for NW-TT parameter changes the NW-TT can initiate the exchange of containers using the NW-TT-initiated Ethernet port management procedure or the NW-TT-initiated Bridge management procedure for notifying NW-TT parameter changes to the TSN AF. The procedures are part of the Ethernet port management and Bridge management services defined in TS 24.519 and illustrated in FIGS. 9-12. In particular, FIG. 9 illustrates a TSN application function (AF)-requested Ethernet port management procedure in accordance with some embodiments. FIG. 10 illustrates a NW-TT-initiated Ethernet port management procedure in accordance with some embodiments. FIG. 11 illustrates a TSN AF-requested bridge management procedure in accordance with some embodiments. FIG. 12 illustrates a NW-TT-initiated bridge management procedure in accordance with some embodiments.

The above procedures are end-to-end procedures conveyed transparently for the intermediate nodes (SMF and PCF) and have nothing to do with the TSN AF subscription with the PCF illustrated in Figure F.1-1 step 2d.

Contrary to the DS-TT PMIC, the information in NW-TT PMIC or BMIC is not specific to any PDU Session. Therefore, in order to initiate a NW-TT PMIC or BMIC delivery to each other, the TSN AF and the NW-TT need to "hijack" a PDU Session on which to piggyback the container delivery.

Currently the 3GPP specifications are unclear on some details. As mentioned earlier, the TSN AF needs to initiate the TSN AF-requested Ethernet port or Bridge management procedure for performing NW-TT parameter subscription, setting NW-TT parameters or reading NW-TT parameters. For sending the related NW-TT PMICs and BMICs the TSN AF needs to "hijack" a PDU Session. This could be e.g. the PDU Session participating in the TSN bridge that was established first.

The following details are unclear:
  Once the TSN AF has selected a PDU Session to "hijack" for the purpose of initiating the TSN AF-requested Ethernet port or Bridge management procedure (e.g. for performing NW-TT parameter subscription, setting NW-TT parameters or reading NW-TT parameters), does the TSN AF need to send all NW-TT PMICs or BMICs by "hijacking" that same session?
  Conversely, when the NW-TT receives a PMIC or BM IC as part of the TSN AF-requested Ethernet port or Bridge management procedure on a specific "hijacked" PDU Session, does the NW-TT need to send the NW-TT PMIC or BMIC for completing the TSN AF-requested Ethernet port or Bridge management procedure by "hijacking" that same session?
  Furthermore, when the NW-TT initiates the NW-TT-initiated Ethernet port or Bridge management procedure (e.g. due to NW-TT parameter change) associated with a NW-TT parameter subscription request from the TSN AF previously received on a specific "hijacked" PDU Session, does the NW-TT need to send all NW-TT PMICs and BMICs by "hijacking" that same session?
  Or maybe the TSN AF needs to perform the NW-TT parameter subscription over more than one "hijacked" PDU Sessions, so that more than one PDU Sessions could be used by the NW-TT for initiating the NW-TT-initiated Ethernet port or Bridge management procedure for the exchange of the NW-TT PMICs and/or BMICs?

Moreover, in order to initiate the TSN AF-requested Ethernet port management procedure (e.g. for performing NW-TT parameter subscription, setting NW-TT parameters or reading NW-TT parameters) the TSN AF needs to know the NW-TT port numbers and provide them together with the NW-TT PMICs. According to current status of TS 29.512 the NW-TT port numbers are provided by the SMF (via PCF) to the TSN AF as part of a TsnBridgeInfo data structure (refer to nwttPortNums in the table below), which is an independent parameter carried outside of the BMIC or PMIC containers.

TS 29.512 Table 5.6.2.41-1: Definition of type TsnBridgeInfo

| Attribute name | Data type | P | Cardinality | Description | Applicability |
|---|---|---|---|---|---|
| bridgeId | Uint64 | O | 0 . . . 1 | Contains the bridge Id defined in IEEE 802.1Q [45] clause 14.2.5. | |
| dsttAddr | MacAddr48 | O | 0 . . . 1 | Contain the MAC address of DS-TT. | |
| nwttPortNums | array(TsnPortNumber) | O | 1 . . . N | NW-TT ports available for a PDU session. | |
| dsttPortNum | TsnPortNumber | O | 0 . . . 1 | DS-TT port allocated to a PDU session. | |
| dsttResidTime | Uinteger | O | 0 . . . 1 | The time taken within the UE and DS-TT to forward a packet between the UE/DS-TT port encoded as specified in subclause 9.11.4.26 of 3GPP TS 24.501 [20] starting with octet 2. | |

The TsnBridgeInfo data primarily contains DS-TT related information. The only information that is NW-TT related is bridgeId and nwttPortNums. The bridgeId parameter has already been moved inside the BMIC (refer to Bridge ID parameter in TS 23.501 Table 5.28.3.1-2). It can be argued that the nwttPortNums parameter should also be moved inside the BMIC.

An improved mechanism is described for exchange of TSN bridge configuration parameters between the NW-TT and the TSN AF, addressing the questions listed above.

The current exchange of NW-TT PMICs and PMICs between the NW-TT and the TSN AFs contains several unclarities related to the subscription mechanism and the selection of PDU Session for exchange of containers.

Embodiments herein may include one or more of the following features:

TSN AF can use any PDU Session participating in the 5GS TSN bridge to initiate the TSN AF-requested Ethernet port or Bridge management procedure.

The NW-TT parameter subscription is performed only once for a specific NW-TT parameter.

TSN AF and NW-TT can use any PDU Session participating in the 5GS TSN bridge to initiate the exchange of NW-TT PMICs and/or BMICs.

The NW-TT port numbers are sent inside the BMIC

The NW-TT PMIC is associated with an indication to instruct the SMF to forward the PMIC to the NW-TT (instead of the DS-TT).

The use of PDU Sessions participating in a 5GS TSN bridge are described for the purpose of:

TSN AF initiation of the TSN AF-requested Ethernet port or Bridge management procedure and NW-TT-initiated Ethernet port or Bridge management procedure, Forwarding of NW-TT PMIC or BMIC from TSN AF to NW-TT, and Forwarding of NW-TT or BMIC from NW-TT to TSN AF.

Figure 13:
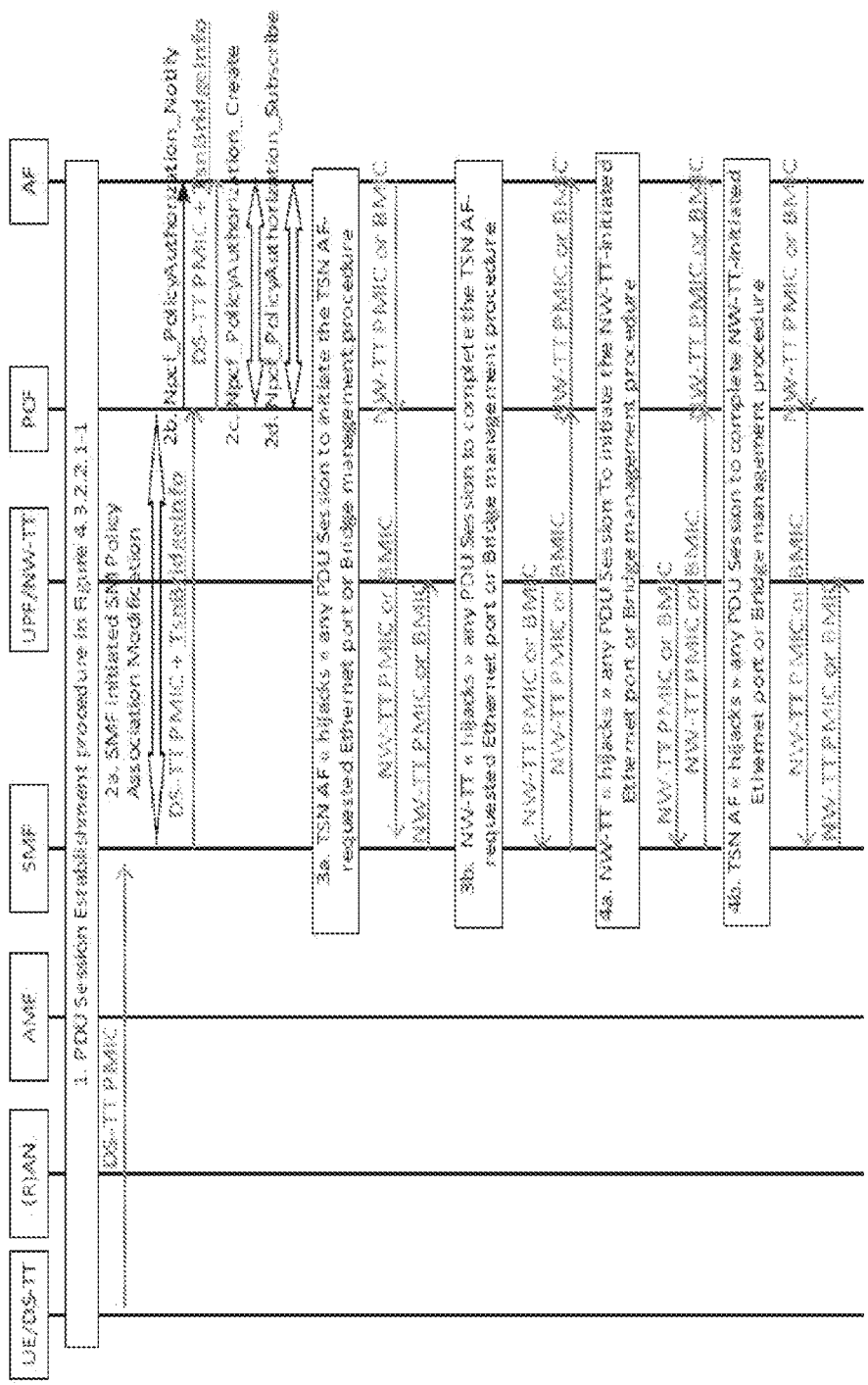
FIG. 13 illustrates a TSN bridge configuration in accordance with some embodiments.

Two options are considered depending on how NW-TT port numbers are provided to the TSN AF:

Option 1: assumes that the NW-TT port numbers are provided as part of the TsnBridgeInfo data structure. FIG. 13 illustrates a TSN bridge configuration in accordance with option 1.

Figure 14:
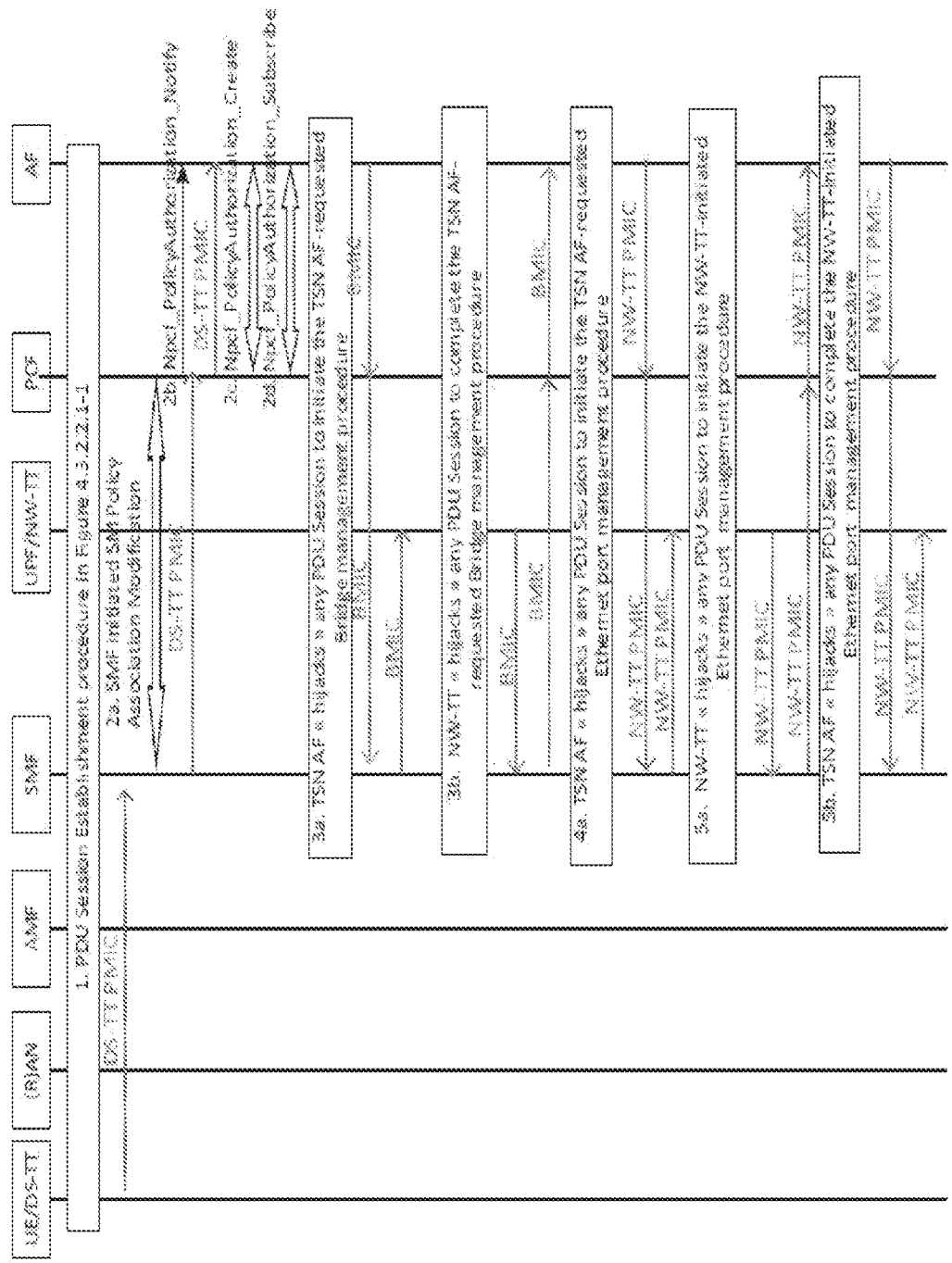
FIG. 14 illustrates another TSN bridge configuration in accordance with some embodiments.

Option 2: assumes that the NW-TT port numbers are provided inside the BMIC. FIG. 14 illustrates a TSN bridge configuration in accordance with option 2.

As shown in FIG. 13:
1. During PDU Session Establishment a DS-TT PMIC is provided to the SMF.
2a. The SMF selects a PCF and forwards the DS-TT PMIC to the PCF, together with the NW-TT port numbers (embedded in the TsnBridgeInfo parameter).
2b. The PCF uses a pre-configured AF session to deliver the DS-TT PMIC to the TSN AF.
2c. TSN AF creates a PDU Session-specific AF session over N5.
2d. TSN AF subscribes with the PCF for "TSN reporting events".
3a. TSN AF randomly chooses any PDU Session participating in the 5GS TSN bridge to initiate the TSN AF-requested Ethernet port or Bridge management procedure (e.g. for performing NW-TT parameter subscription, setting NW-TT parameters or reading NW-TT parameters) and send a BMIC or NW-TT PMIC to NW-TT.
3b. NW-TT randomly chooses any PDU Session participating in the 5GS TSN bridge to complete the TSN AF-requested Ethernet port or Bridge management procedure and send a BMIC or PM IC to TSN AF.
4a. NW-TT randomly chooses any PDU Session participating in the 5GS TSN bridge to initiate the NW-TT-initiated Ethernet port management procedure and send a BMIC or NW-TT PMIC to TSN AF.
4b. TSN AF randomly chooses any PDU Session participating in the 5GS TSN bridge to complete the NW-TT-initiated Ethernet port or Bridge management procedure and send a BMIC or NW-TT PMIC to NW-TT.

Option 2 described in FIG. 14 differs from Option 1 (FIG. 13) in the following aspects:
2a, 2b. The NW-TT port numbers are not provided as part of the TsnBridgeInfo
3a. TSN AF randomly chooses any PDU Session participating in the 5GS TSN bridge to initiate the TSN AF-requested Bridge management procedure (e.g. for reading new NW-TT parameter "NW-TT port numbers") and send a BMIC to NW-TT.

3b. NW-TT randomly chooses any PDU Session participating in the 5GS TSN bridge to complete the TSN AF-requested Bridge management procedure and send a BMIC to TSN AF. In this option the TSN AF obtains the NW-TT port numbers inside the BMIC.

4a. TSN AF randomly chooses any PDU Session participating in the 5GS TSN bridge to initiate the TSN AF-requested Ethernet port management procedure (e.g. for performing NW-TT parameter subscription, setting NW-TT parameters or reading NW-TT parameters) and send a NW-TT PMIC including a NW-TT number. This step is performed for each of the NW-TT port numbers. The NW-TT PMIC is associated with an indication that this is a NW-TT PMIC. This indication instructs the SMF to route the PMIC to the NW-TT (instead of routing it to the DS-TT).

4b. NW-TT randomly chooses any PDU Session participating in the 5GS TSN bridge to complete the TSN AF-requested Ethernet port management procedure and send a NW-TT PMIC to TSN AF including a NW-TT port number. To support Option 2 the BMIC definition defined in TS 23.501 clause 5.28.3.1-2 may be enhanced to include the NW-TT port numbers, as indicated below.

| Bridge management information | Supported operations by TSN AF (see NOTE 1) | Reference |
|---|---|---|
| Information for 5GS Bridge | | |
| Bridge Address | R | |
| Bridge Name | R | |
| Bridge ID | R | |
| | R | |
| Topology of SGS Bridge | | |
| Chassis ID subtype and Chassis ID of the 5GS Bridge | R | IEEE 802.1AB [97] |
| Traffic forwarding information | | |
| Static Filtering Entry (NOTE 3) | RW | IEEE 802.1Q[98] clause 8.8.1 |
| General Neighbor discovery configuration (NOTE 2) | | |
| adminStatus | RW | IEEE 802.1AB [97] clause 9.2.5.1 |
| IldpV2LocChassisIdSubtype | RW | EE 802.1AB [97] Table 11-2 |
| IldpV2LocChassisId | RW | IEEE 802.1AB [97] Table 11-2 |
| IldpV2MessageTxInterval | RW | IEEE 802.1AB [97] Table 11-2 |
| IldpV2MessageTxHoldMultiplier | RW | IEEE 802.1AB [97] Table 11-2 |
| DS-TT port neighbor discovery configuration for DS-TT ports (NOTE 4) | | |
| >DS-TT port neighbor discovery configuration for each DS-TT port | | |
| >>DS-TT port number | RW | |
| >>IldpV2LocPortIdSubtype | RW | IEEE 802.1AB [97] Table 11-2 |
| >>IldpV2LocPortId | RW | IEEE 802.1AB [97] Table 11-2 |
| Discovered neighbor information for DS-TT ports (NOTE 4) | | |
| >Discovered neighbor information for each DS-TT port (NOTE 4) | | |
| >>DS-TT port number | R | |
| >>IldpV2RemChassisIdSubtype | R | IEEE 802.1AB [97] Table 11-2 |
| >>IldpV2RemChassisId | R | IEEE 802.1AB [97] Table 11-2 |
| >>IldpV2RemPortIdSubtype | R | IEEE 802.1AB [97] Table 11-2 |
| >>IldpV2RemPortId | R | IEEE 802.1AB [97] Table 11-2 |
| >>TTL | R | IEEE 802.1AB [97] clause 8.5.4.1 |
| Stream Parameters | | |
| Maximum number of filters, which defines the maximum number of streams that the bridge can handle | R | IEEE 802.1Q [98] |
| Maximum number of gates, which can be equal or less than the maximum number of filters | R | IEEE 802.1Q [98] |
| Maximum number of meters (optional) if measurements are required | R | IEEE 802.1Q [98] |
| Maximum length of the PSFPAdminControlList parameter that can be handled | | IEEE 802.1Q [98] |

NOTE 1:
R = Read only access; RW = Read/Write access.
NOTE 2:
General neighbor discovery information is included only when NW-TT performs neighbor discovery on behalf of DS-TT.
NOTE 3:
If the Static Filtering Entry information is present, NW-TT uses Static Filtering Entry information to determine the NW-TT egress port for forwarding UL TSC traffic. If the Static Filtering Entry information is not present, then the forwarding information as in clause 5.8.2.5.3 applies.
NOTE 4:
DS-TT discovery configuration and DS-TT discovery information are used only when DS-TT does not support LLDP and NW-TT performs neighbor discovery on behalf of DS-TT. These IEs are deliverered via the procedures for the PDU session for the DS-TT port, while the other IEs of the table are deliverered via the procedures for any of the PDU sessions of the 5GS TSN bridge.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a session management function (SMF), the apparatus comprising:
    processing circuitry configured to:
        decode, from a policy control function (PCF), a Port Management Information Container (PMIC) and port number, the PMIC including Per-Stream Filtering and Policing (PSFP) information with a table of Stream Filter Instances, each instance comprising a Stream Identification type value defined in IEEE 802.1CB clause 9.1.1.6 and Stream Identification controlling parameters defined in IEEE 802.1CB Table 9-1 and clauses 9.1.2, 9.1.3, 9.1.4, the Stream Identification controlling parameters dependent on the Stream Identification type value;
        determine that the port number is associated with a port on a device side time sensitive network (TSN) translator (DS-TT) or a network-side TSN translator (NW-TT); and
        in response to a determination that the port is on the DS-TT, encode the PMIC for transmission to the DS-TT in a packet data unit (PDU) Session Modification Request message.

2. The apparatus of claim 1, wherein the Stream Identification controlling parameters comprise a Source medium access control (MAC) address and Virtual Local Area Network (VLAN) tag, a Destination MAC address and the VLAN tag, an internet protocol (IP) source address, an IP destination address, a Differentiated Services Code Point (DSCP) value, an IP next protocol value, a source port, and a destination port.

3. The apparatus of claim 2, wherein each of the Stream Identification controlling parameters are selected from among non-wildcard Stream Identification controlling parameters and a wildcard value that matches any value corresponding to the non-wildcard Stream Identification controlling parameters.

4. The apparatus of claim 3, wherein the PMIC is received in a policy control update notify message.

5. The apparatus of claim 4, wherein the processing circuitry is configured to decode a time sensitive communication (TSC) assistance container and policy and charging (PCC) rules from the PCF in the policy control update notify message.

6. The apparatus of claim 5, wherein the Stream Identification type value and Stream Identification controlling parameters are applicable to both the DS-TT and the NW-TT.

7. The apparatus of claim 6, wherein:
    the DS-TT is disposed in a distributed TSN bridge, and
    the Stream Identification type value and Stream Identification controlling parameters identify a stream for the DS-TT or the NW-TT as signaled from a centralized network configuration (CNC) as part of PSFP information.

8. The apparatus of claim 7, wherein in response to a determination that the port is on the NW-TT, the processing circuitry is configured to encode the Port Management Information Container for transmission to the NW-TT in a N4 Session Modification Request message.

* * * * *